United States Patent [19]
Fouquet et al.

[11] Patent Number: 5,595,399
[45] Date of Patent: Jan. 21, 1997

[54] ENERGY-ABSORBING DEVICE WITH AXIAL HOLDING FOR AUTOMOBILE VEHICLE STEERING COLUMNS

[75] Inventors: Jean-Michel Fouquet; Benoît Duval, both of Vendome; Pascal Millet, Meslay, all of France

[73] Assignee: NACAM, Vendome, France

[21] Appl. No.: 368,984

[22] Filed: Jan. 5, 1995

[30] Foreign Application Priority Data

Jan. 6, 1994 [FR] France ................... 94 00084

[51] Int. Cl.$^6$ ................................. B62D 1/19
[52] U.S. Cl. ............................ 280/777; 74/493
[58] Field of Search ................... 280/775, 777; 74/493, 492; 180/78; 188/371, 374

[56] References Cited

U.S. PATENT DOCUMENTS

| | | | |
|---|---|---|---|
| 4,733,575 | 3/1988 | Nakamura | 280/777 |
| 4,901,592 | 2/1990 | Ito et al. | 280/777 |
| 4,998,999 | 3/1991 | Yuzuriha et al. | 280/777 |
| 5,131,286 | 7/1992 | Sturges et al. | 280/777 |
| 5,286,056 | 2/1994 | Speich | 280/777 |
| 5,306,032 | 4/1994 | Hoblingre et al. | 280/775 |

FOREIGN PATENT DOCUMENTS

| | | |
|---|---|---|
| 0179690 | 4/1986 | European Pat. Off. |
| 0252031 | 1/1988 | European Pat. Off. |
| 0557767A1 | 9/1993 | European Pat. Off. |
| 3619125C1 | 10/1987 | Germany . |
| 1120799 | 7/1968 | United Kingdom . |
| 2116496 | 9/1983 | United Kingdom . |
| 2268125 | 1/1994 | United Kingdom . |

OTHER PUBLICATIONS

"Deforming Wire Absorbs Shock" (entire article), *Machine Design*, vol. 37, No. 30 (Dec. 23, 1965), Cleveland, Ohio, U.S.A. (no author given).

*Primary Examiner*—Paul N. Dickson
*Attorney, Agent, or Firm*—Emmanuel J. Lobato; Burns & Lobato, P.C.

[57] ABSTRACT

An energy-absorbing device for an automobile steering column adjustable in depth and/or inclination mounted on a support structure fixed to the vehicle body. The body-tube and steering shaft are clamped and locked in the support structure. A securing device with a rotatable elongate tightening element, such as a bolt or rod, and an operator for rotating the axis of the tightening element clamps the body-tube between coacting clamping elements and vertical sides of the support structure. Provision is made for depth adjustment and inclination of the steering column body-tube by slots in the clamping elements and support structure that allow positioning the tightening element axis at a selected position in accordance with a selected depth and inclination of the body-tube. An energy-absorbing element, in the form of a flat coiled band or a coiled wire, is fixed to an end of the body-tube facing the vehicle steering wheel so that an impact force applied at that end and parallel to the longitudinal axis of the body-tube effects axial translation of the body-tube relative to the support structure. Intermediate toothed elements of the securing device connect the energy-absorbing element to the body-tube and the securing device operator which translates in response to the body-tube translation. If the impact force reaches the value of the tightening or clamping forces, the energy-absorbing element absorbing element absorbs the energy of the impact force as the body-tube translates.

16 Claims, 4 Drawing Sheets

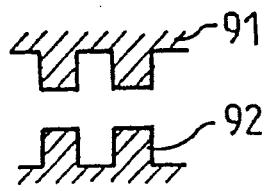
FIG.3　　　FIG.4　　　FIG.5
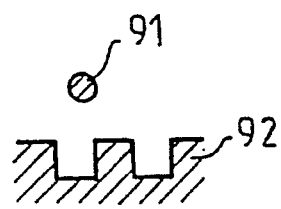
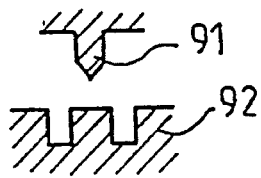
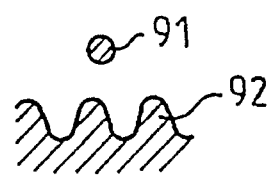
FIG.6　　　FIG.7　　　FIG.8
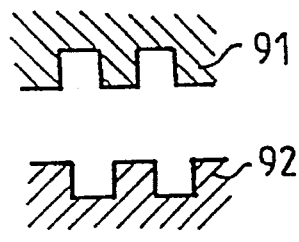
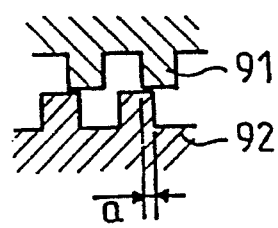
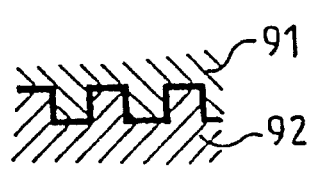
FIG.9A　　　FIG.9B　　　FIG.9C

ENERGY-ABSORBING DEVICE WITH AXIAL HOLDING FOR AUTOMOBILE VEHICLE STEERING COLUMNS

This invention relates to an energy-absorbing device for an automobile vehicle steering column adjustable in depth and/or in inclination, whose steering shaft is mounted in a body-tube, which is supported and locked to the vehicle body in the desired position.

Many energy-absorbing devices are known that are adaptable to automobile vehicle steering columns whose depth and/or inclination cannot be adjusted. The problem is more delicate with steering columns that can be adjusted either in depth or in inclination. Such a device adaptable to a steering column adjustable in inclination is described in document U.S. Pat. No. 4.901.592. It comprises a plate in the form of a U in which the end of one branch is connected to the steering column and the other to a support fixed to the vehicle body. The absorption of energy is performed by the displacement and deformation of the curved part of the U-shaped plate.

In the case of steering columns adjustable in both depth and inclination, the problem is even more delicate. Supports are known that allow this double adjustment. To illustrate such devices of the Prior Art, one can mention notably those described in documents DE-36 19 125 and GB-2.116.496. But in these two documents, the supports described do not include an energy-absorbing system. Document GB-2.268.125 defines an energy-absorbing device which can be adapted to a steering column adjustable in both depth and in inclination. In this device, a rigid support comprising two longitudinal slots, parallel to the axis of the column, is coupled to the column tube. A bolt connects this support to a console allowing the adjustment of the steering column. This bolt is associated with a deformable band, welded to the support. This device absorbs the energy in the case of an impact by displacement of the bolt, towards the outside of the longitudinal slots, leading to a displacement of the curved part of the deformable band. The absorption system does not intervene during adjustment of the column, nor during the first phase of the impact.

Known devices are unable to absorb a constant value predetermined force irrespective of adjustment position. In addition, at the time of an impact, these devices do not maintain the steering column at the same angular adjustment it had prior to the impact.

The object of the invention is to propose an energy-absorbing device for an automobile vehicle steering column adjustable in depth and/or inclination which is able to absorb a predetermined force applied to the driver's steering point, and to do this irrespective of the adjustment position, maintaining the steering column at the same angular adjustment it had prior to the impact.

According to the invention, the energy-absorbing device adapts to an automobile vehicle steering column adjustable in depth and/or inclination, the steering shaft of which is mounted in a body-tube that is supported and locked to the vehicle body in the desired position.

This device comprises:

- a support fixed to the vehicle body and receiving the body-tube,
- a system for locking the body-tube in the support, the locking axis of which is perpendicular to the steering column axis, the locking system operated by means of an operating device,
- a depth adjustment system working with the locking system,
- an inclination adjustment system working with the locking system,
- an energy-absorbing system arranged between the body-tube and the operating device, and acting in a direction substantially parallel to the steering column axis,
- an energy-absorbing system connected, on the one hand:
  to the end of the body-tube facing the driver's wheel, and on the other hand
  to a system for securing to a fixed element,
- the securing system and locking system being arranged in such a way that when the locking system is loosened by the operating lever, this operating lever disengages the securing system.

Advantageously, the system for locking the body-tube in a support, comprising two vertical members, is made up of:

- a tightening rod traversing the two tightening brackets provided on each vertical member of the support,
- a movement transformation system mounted on the outside of one of the vertical members, at the end of the tightening rod,
- an axial holding means mounted on the outside of the other vertical member on the other end of the tightening rod,
- an operating device mounted on the movement transformation system, in such a way that by turning the operating device in the desired direction about the locking axis, the desired locking is obtained via the movement transformation system.

To get the most from this architecture, the depth adjustment system is made up of an elongated hole made in each of the vertical members, each elongated hole being substantially parallel to the axis of the steering column and slightly wider than the diameter of the tightening rod, such that said tightening rod can traverse and slide easily in each of these elongated holes.

Preferably, the inclination adjustment system is made up of an elongated hole made in each bracket of the support, in a direction such that it is possible to angularly adjust the column, the width of said elongated hole being fractionally wider than the diameter of the tightening rod, such that the tightening rod can slide in each of these elongated holes, while ensuring locking.

According to one embodiment, the securing system comprises:

- a toothed part rigidly locked to the tightening rod,
- a toothed part rigidly locked to the energy-absorbing system, provided with an oblong passage hole for the tightening rod to allow the depth adjustment distance of travel,
- the minimum displacement required to unlock the toothed parts, i.e. to move one toothed part with respect to the other being less than the tightening distance of travel of the tightening rod given by the movement transformation system.

According to another embodiment, the securing system comprises:

- a toothed part fixed to the support,
- a toothed part rigidly locked to the energy-absorbing system provided with an oblong passage hole for the rod allowing the depth adjustment distance of travel,
- a coupling system for the two parts fixed to the command of the locking system, the uncoupling distance of travel being less than the loosening distance of travel.

The toothed parts can be produced in different ways: the toothed parts may have teeth of triangular, rectangular or square section. One of the toothed parts can present a single tooth, notably triangular, while the other is provided with teeth of corresponding section, notably triangular. One of the parts can have square teeth and the other a circular protuberance. One of the parts can have rectangular teeth and the other a rectangular protuberance with a tooth chamfer. According to a modified embodiment, one of the parts has rounded teeth and the other part a circular protuberance.

According to one embodiment of the invention, the energy-absorbing system is a tie rod in the form of a flat element wound around a transversal support mounted on the body-tube, so as to have a first part whose end is connected to the toothed part, and which is in the extension of these two toothed parts; and a second part after the transversal support in the form of a return, so that in the event of an impact the return unwinds under a predetermined force to absorb the desired energy.

According to another embodiment of the invention, the energy-absorbing system is made up of a damping device interposed between two elements likely to move apart from each other under the action of an external force, said device essentially comprising a wire wound around a supporting axis, mounted in rotation on the first element, the end of the winding being fixed onto said supporting axis, while the other end of the wire is fixed onto the second element, the part of the wire extending between the two elements being substantially oriented in the direction of force, such that the traction exerted on the wire by the moving apart of the two elements causes the wound part of the wire to unwind around the supporting axis and, thus, absorb the force.

The cross-section of the wire can be constant or evolutive. Likewise, the winding pitch of the wire on the supporting axis can be constant or evolutive.

The constituent matter of the wire is chosen to be able to withstand considerable traction forces. The wire can therefore be made from metal, for example steel, or from plastic material.

According to one embodiment, the first element is provided with a part having a general U shape, a rod extending between the wings of the U and to which it is fixed, said rod receiving a sleeve around which the wire is wound, said sleeve able to turn on the rod, and the end of the winding being fixed onto the sleeve.

According to a modified embodiment, the wire can be wound directly around the rod and its end fixed to said rod.

The other end of wire is secured to the second element by any suitable means. For example, if the wire is metallic, a securing plate can be welded to the end of the wire, said plate comprising a passage hole for a means to secure said plate to the second element.

For a description of such an embodiment, the reader will find it useful to refer to the Patent Application filed by the Applicant on the same day entitled "Energy-absorbing Device for Automobile Vehicle Steering Columns".

While remaining within the scope of the invention, and with a view to improving the structure of the energy-absorbing device of the invention, the body-tube can be provided with a position holding device comprising two tightening Vs each arranged between one of the vertical members of the body-tube, with the two faces of the V bearing against the body-tube, in such a way that when a depth or inclination adjustment is made, each V follows the movement of the body tube by sliding along the bearing wall of the corresponding tightening bracket. This holding system comprises a system for angularly guiding each tightening V in the corresponding vertical member, and comprises a pin carried by the outer face of each tightening V, which penetrates and slides in a slot made in the corresponding tightening bracket. Each slot is inclined with respect to the steering column axis so as to be substantially perpendicular to the trajectory of the driver at the time of an impact. Furthermore, the holding system is provided with a system to prevent the body-tube rotating about its axis, said anti-rotation system consisting of a plate fixed below the body-tube, and comprising two wings arranged parallel to each vertical member, the distance between the outer faces of said wings being slightly less than the spacing of the bearing walls of the tightening brackets. In this anti-rotation system, the wings of the plate are traversed by the axis of the locking system. According to a modified embodiment, the anti-rotation system consists of a central element fixed under the body-tube, and which is traversed by the axis of the locking system.

The energy-absorbing device of the invention for automobile vehicle steering columns adjustable in depth and/or inclination therefore presents the advantage of absorbing the same force applied to the driving point whatever the adjustment position. In addition, this device retains the column's angular adjustment at the time of the impact.

The present invention will now be illustrated by means of non-limiting examples which must be read in conjunction with the attached drawings in which:

FIGS. 3 to 8 show sectional views of different modified embodiments of securing system according to the invention.

FIGS. 9A, 9B and 9C are cross sectional views of the different securing phases.

DESCRIPTION OF THE PREFERRED EMBODIMENTS

Figure 1:
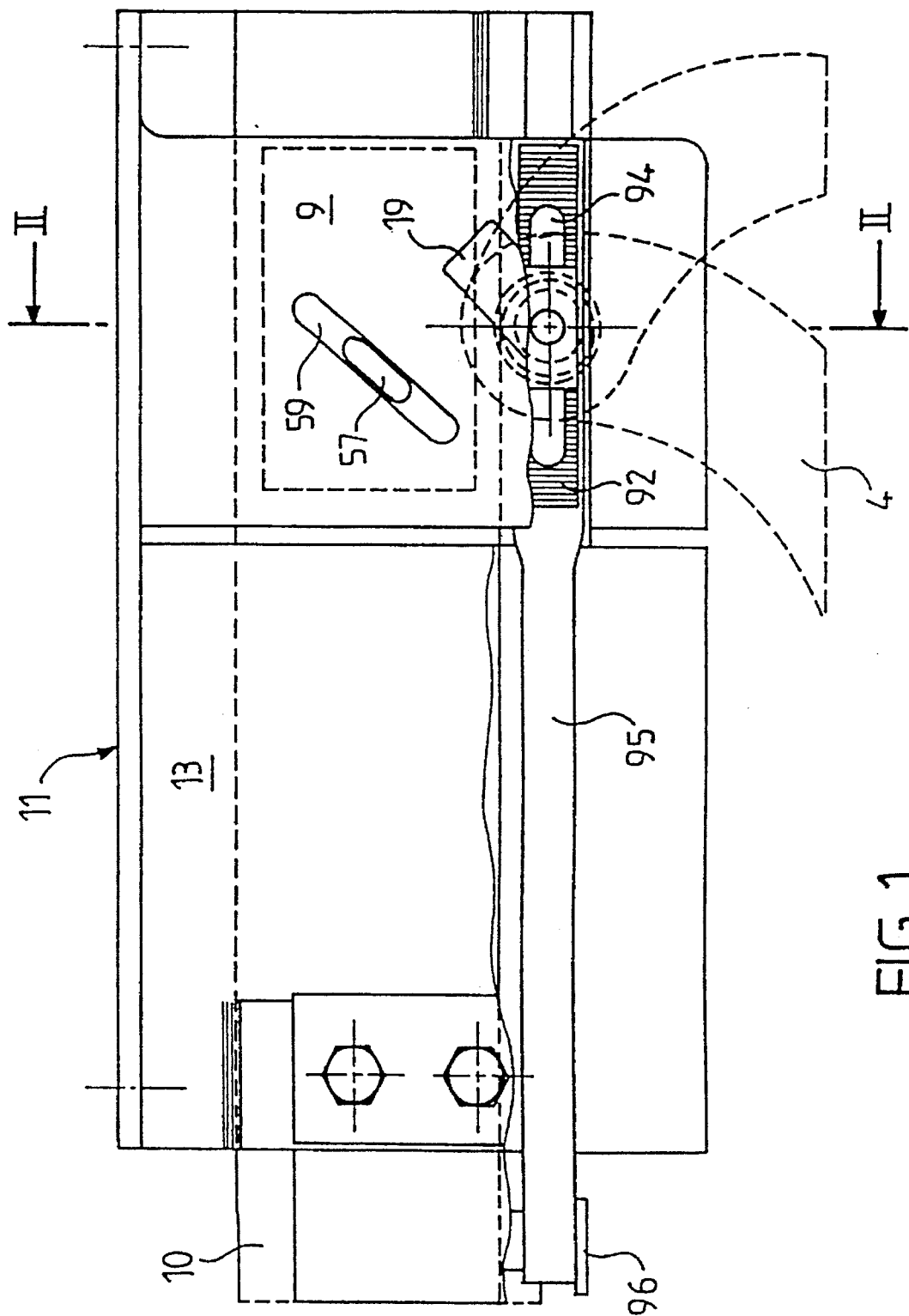
FIG. 1 is a longitudinal view in the axial direction of an energy-absorbing device for a steering column according to the invention.
Figure 2:
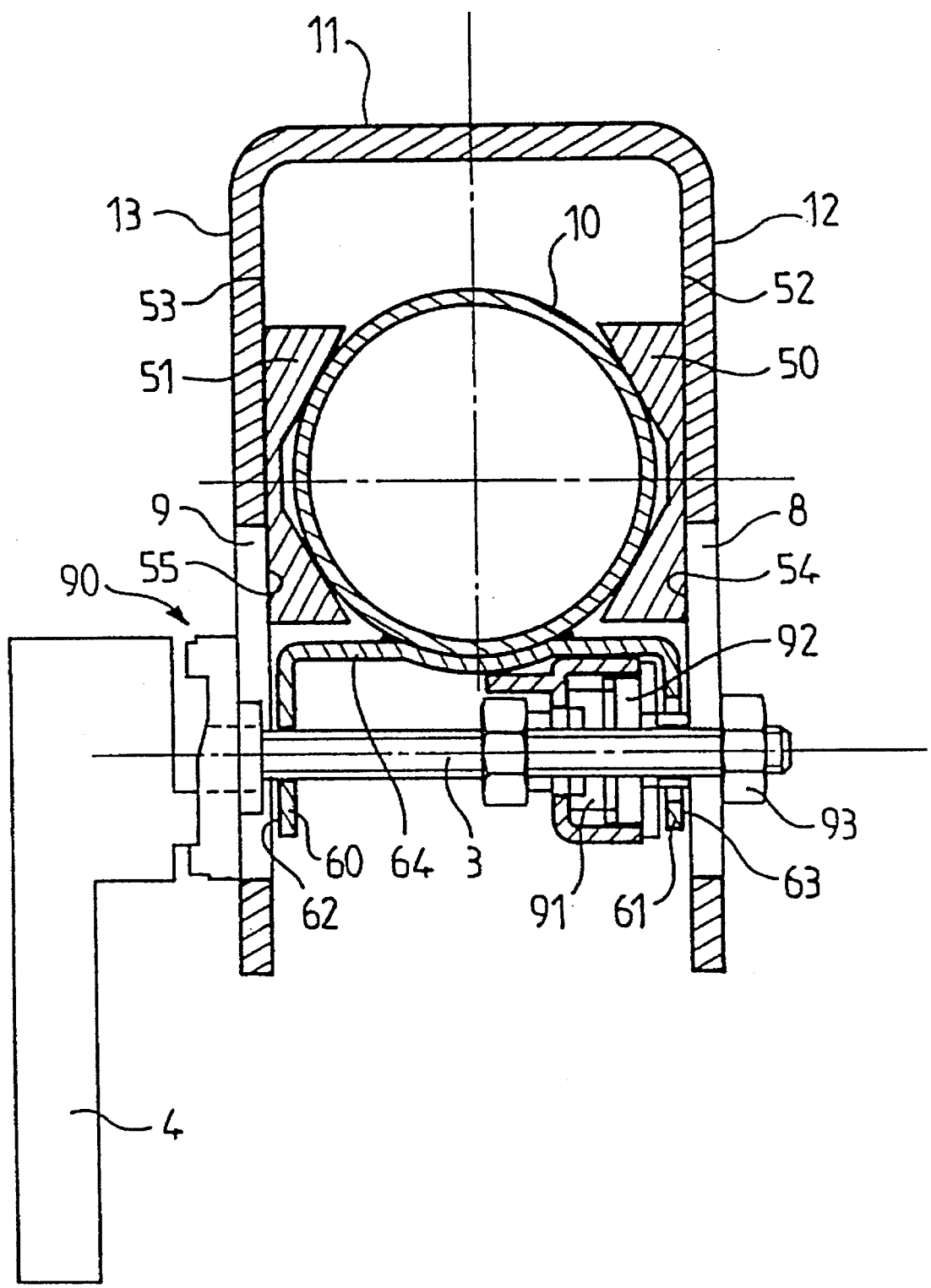
FIG. 2 is a half-section along line II—II of FIG. 1.

As can be seen in FIGS 1 and 2, the energy-absorbing device of the invention is mounted on an automobile vehicle steering column adjustable in depth and/or inclination. The steering shaft of this steering column is mounted in a body-tube 10. This body-tube 10 is supported and locked to the vehicle body in the desired position.

The energy-absorbing device of the invention essentially comprises:

a support 11 which is fixed to the vehicle body and receives body-tube 10, a system for locking body-tube 10 in support 11, the locking axis being perpendicular to the axis of the steering column, and the locking system acting by means of an operating device 4, a depth adjustment system which works with the locking system, an inclination adjustment system which works with the locking system, an energy-absorbing system arranged between body-tube 10 and operating device 4, and which acts in a direction substantially parallel to the axis of the steering column, the energy-absorbing system being connected on the one hand:

alongside the end of body-tube 10 facing the driver's wheel, and on the other hand to a system for securing to a fixed element, in the locked position of the column.

the securing system and locking system are arranged such that when the locking system is loosened by means of operating lever 4, said operating lever 4 causes the locking system to uncouple.

As can be seen in FIGS. 1 and 2, support 11 is made up of two vertical members referenced 12 and 13 which are connected to each other by means of an upper connecting element. Furthermore, two cut-outs are made on vertical members 12 and 13, in such a way as to provide a tightening bracket 8 on vertical member and a tightening bracket 9 on vertical member 13. Finally, elongated holes 19 are provided, respectively, in each tightening bracket 8 and 9. These elongated holes 19 are intended to receive the locking system and to allow the inclination to be adjusted.

Body-tube 10 comprises a strengthening square made up of two vertical members which are connected to each other by means of a lower connecting element. This strengthening square is welded onto body-tube 10. Furthermore, each vertical upright comprises an elongated hole. These elongated holes are intended to receive the locking system and to allow the depth of adjustment of the steering column.

The system for locking body-tube 10 in support 11 is made up of tightening rod 3. Tightening rod 3 traverses the two tightening brackets 8 and 9 which are provided on each vertical member 12 and 13 of support 11.

A movement transformation system 90 is mounted on the outside of one of the vertical members 13, i.e. at the end of tightening rod 3. An axial holding means 93 is mounted on the outside of the other vertical member 12 on the other end of tightening rod 3. Finally, operating device 4 is mounted on movement transformation system 90, in such a way that by turning operating device 4 in the desired direction about the locking axis, the desired locking is obtained via movement transformation system 90.

The depth adjustment system is made up of elongated holes provided in each vertical member of the strengthening square. Each of these elongated holes is substantially parallel to the axis of the steering column, and is fractionally wider than the diameter of tightening rod 3, such that tightening rod 3 is able to traverse and slide easily in each of these elongated holes.

The inclination adjustment system is made up of elongated holes 19 provided in each of the brackets 8 and 9 of support 11. The direction of each of these elongated holes 19 is such that the angular position of the steering column can be adjusted. Furthermore, these elongated holes 19 are fractionally wider than the diameter of tightening rod 3, in order that this tightening rod 3 can slide in each of these elongated holes 19 while ensuring the locking of the steering column.

The securing system shown in FIGS. 1 and 2 comprises a toothed part 91 which is rigidly locked to tightening rod 3 in the axial direction of this tightening rod 3, and a toothed part 92 which is rigidly locked to the energy-absorbing system. The toothed part 92 is provided with an oblong passage hole 94 for tightening rod 3 to allow the distance of travel of the depth adjustment. Toothed parts 91 and 92 are arranged such that the minimum displacement required in the axial direction of tightening rod 3 in order to unlock one from the other, i.e. the displacement of part 91 with respect to part 92, is less than the tightening distance of travel of tightening rod 3, which is given by the movement transformation system 90.

Another securing system of the invention, which is not shown in the Figures, comprises one toothed part connected to support 11, and one toothed part rigidly locked to the energy-absorbing system. The latter toothed part is provided with an oblong passage hole for rod 3 which allows the distance of travel of the depth adjustment. The system for coupling the two toothed parts is fixed to the command of the locking system, such that the uncoupling distance of travel is less than the loosening distance of travel.

One embodiment of the energy-absorbing system is shown in FIG. 1 and comprises a tie rod 95 in the form of a flat element wound around a transversal support 96. This transversal support 96 is mounted on body-tube 10. Thus, tie rod 95 has a first part whose end is connected to the toothed part 92, and which is in the extension of this toothed part 92. Tie rod 95 has a second part after transversal support 96 which is in the form of a return, so that at the time of an impact tie rod 95 unrolls under a determined force to absorb the desired energy.

FIGS. 3 to 8 show different embodiments of toothed parts 91 and 92. In FIG. 3, toothed parts 91 and 92 have triangular section teeth. In the case of FIG. 4, toothed parts 91 and 92 have square section teeth. In FIG. 5, toothed part 91 has a single triangular tooth, whereas toothed part 92 has triangular section teeth. FIG. 6 shows a toothed part 92 with square teeth, and a part 91 with a single circular protuberance. In FIG. 7, part 91 has a rectangular protuberance with a tooth chamfer, whereas part 92 is provided with rectangular teeth. Finally, in the case of FIG. 8, part 91 has a circular protuberance, and part 92 is provided with rounded teeth.

The energy-absorbing system is designed in such a way that when subjected to a traction force, it absorbs a constant force by deforming. Toothed parts 91 and 92 are made in such a way that they intermesh like two racks intermeshing. Toothed part 92 is provided with an oblong hole 94, whose diameter is fractionally wider than tightening rod 3. The length of this oblong hole 94 is such that it allows tightening rod 3 to move over a distance of travel equal to the distance of travel of the steering column depth adjustment. The minimum displacement in the perpendicular direction in order to disengage toothed parts 91 and 92, and move toothed part 91 with respect to toothed part 92 is referenced c. The movement transformation system 90 is used in the column adjustment phase, and serves to transform the movement of operating device 4 activated by the user, into a displacement d of the tightening rod along its axis. This displacement d is used to maintain the steering column in position once the adjustment phase of the column has been performed, by bringing closer together tightening brackets 8 and 9, which clamp body-tube 10. The tightening system of the steering column is independent of the system described, from the moment that displacement d of the tightening rod is, along its axis only, greater than displacement c required to disengage toothed parts 91 and 92. Likewise, the energy-absorbing system is independent of the system described. The only part taken into account is input part 92 fixed onto the energy-absorbing system made up for example of tie rod 95.

The energy-absorbing device, in the form of tie rod 95, is fixed to body-tube 10 in a permanent manner by means of transversal support 96. Toothed part 91 is fixed in rigid fashion to tightening rod 3. In the rest phase, i.e. the steering column adjusted and maintained in the angular and/or depth position by the tightening system, toothed parts 91 and 92 are pressed against each other. In the column adjustment phase, when operating device 4 is loosened, tightening rod 3 moves by a value d and fully drives toothed part 92. Toothed part 91 disengages from toothed part 92. The two toothed parts 91 and 92 being free with respect to each other, the depth and inclination of the steering column can be adjusted. The force required for the adjustment is then due only to the force of displacement of the parts with respect to each other. When operating device 4 is tightened, tightening rod 3 drives part 91 in the reverse movement to that described above, and the two toothed parts 91 and 92 become once again rigidly locked with each other.

Any force applied along the axis of the steering column is first of all recovered by the locking system. If the force applied is greater than the capacity of the locking system, body-tube 10 will tend to slide, driving in its movement one end of the energy-absorbing device represented in the example by tie rod 95. The other end of the tie rod 95 is fixed to the toothed part 92, which is then rigidly locked to toothed part 91, itself fixed onto tightening rod 3 immobile in translation. Thus, the energy-absorbing device represented by tie rod 95 is locked, on the one hand, to the body-tube, mobile in translation, and, on the other hand, to a part fixed in translation of the steering column. Tie rod 95 of the energy-absorbing device will then be activated, and it will absorb energy for as long as the force applied exists. Note that energy is absorbed almost instantaneously whatever the depth or inclination position of the column.

The different phases of locking of toothed parts 91 and 92 are shown in FIGS. 9A, 9B and 9C. In FIG. 9A, the system is in the adjustment phase, whereas in FIG. 9B, the teeth of parts 91 and 92 are touching each other at the start of tightening of operating device 4. After a short distance of travel, as can be seen in FIG. 9B, the physical locking shown in FIG. 9C is achieved.

The energy-absorbing device of the invention thus presents the advantage of adapting to steering columns that are adjustable in depth and/or inclination, and also presents the characteristic that at the time of an impact, it absorbs a constant force at the level of the steering wheel over a defined distance of travel whatever the adjustment position of the column, and that this level of force is reached after a very short displacement of the steering wheel.

Figure 10:
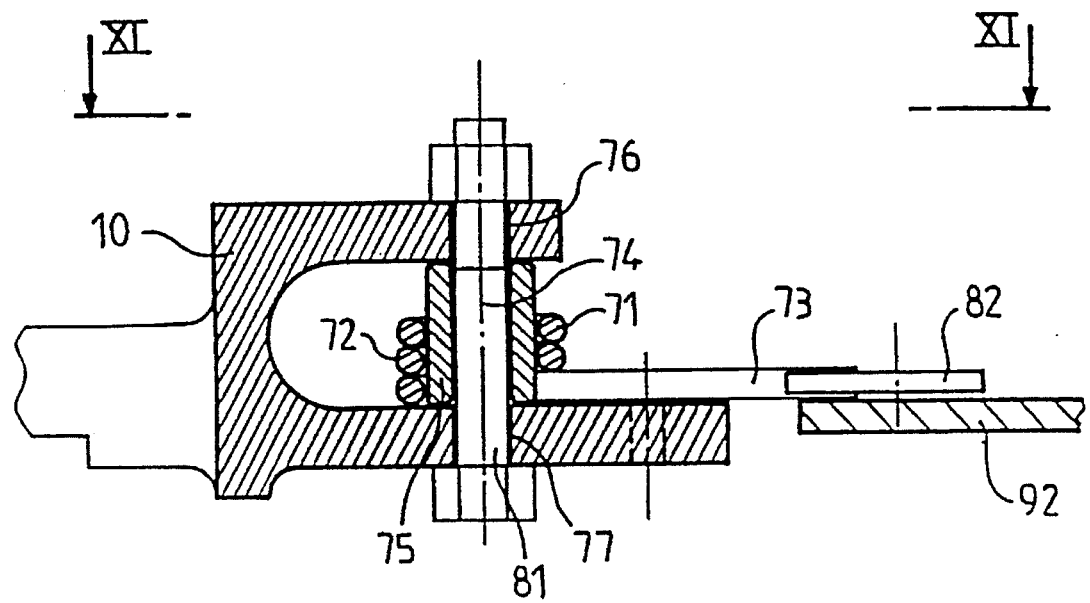
FIG. 10 is a cross-sectional view of an embodiment of the energy-absorbing system according to the invention.
Figure 11:
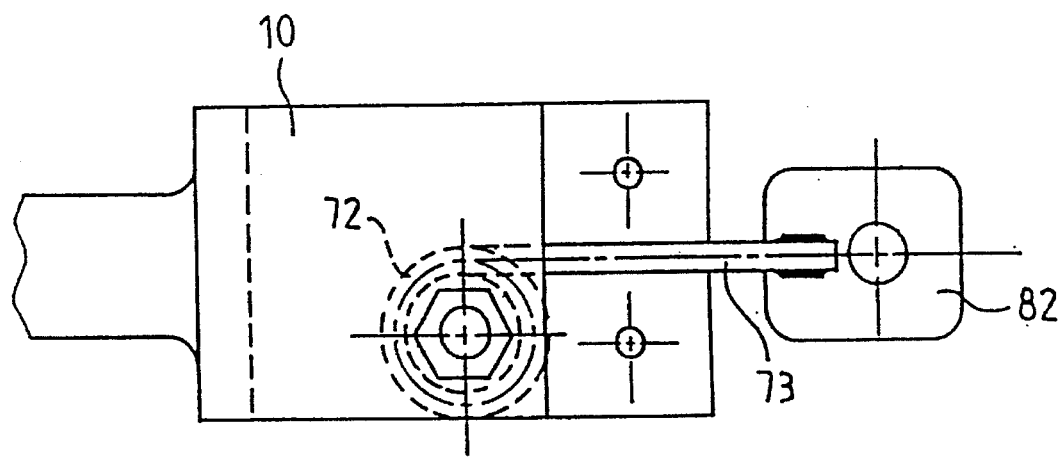
FIG. 11 is a view along line XI—XI of FIG. 10.

Another embodiment of the energy-absorbing system of the invention is shown in FIGS. 10 and 11. This energy-absorbing system comprises a wire 71, with a winding 72, and a rectilinear part 73. Part 72 is wound around a holding axis 74. The holding axis 74 is mounted on the body-tube 10, the free end of rectilinear part 73 being fixed onto toothed part 92, in such a way that part 73 is substantially in the same direction as the force to be absorbed. Thus, at the time of an impact, the impact generates the traction force required to unwind winding 72 of wire 71, making wire 71 change from a wound form to an almost rectilinear form, thereby absorbing the energy required.

In this energy-absorbing system, the cross-section of wire 71 can be constant or evolutive, and the diameter of the winding of wire 71 can also be constant or evolutive. Wire 71, depending on requirements, can be metallic or made from a plastic material. In order to improve the energy-absorbing system, the axis is made up of a sleeve or spacer 75 which is mounted between the two arms 76 and 77 of body-tube 10. Spacer 75 and the two arms 76 and 77 are provided with holes traversed by a bolt 81, which holds the assembly in position. The end of winding 72 can be fixed to the spacer 75. A securing plate 82, welded to the end of part 73 of wire 71, is connected to toothed part 92.

As shown in FIGS. 1 and 2, body-tube 10 of the steering column is held in position by two tightening Vs 50 and 51. These two tightening Vs 50 and 51 are each arranged between one of the corresponding vertical members 12 and 13 and body-tube 10, with the two faces of each tightening V bearing against body-tube 10, in such a way that at the time of an inclination adjustment, each tightening V 50 and 51 follows the movement of body-tube 10 by sliding along bearing wall 52 and 53 of the corresponding tightening bracket 8 and 9, and at the time of a depth adjustment, body-tube 10 slides in tightening Vs 50, 51.

This holding comprises a system for angularly guiding each tightening V 50 and 51 in the corresponding vertical upright 12 and 13. This angular guide system is made up of a pin 57 provided on the outer face 54 and 55 of each tightening V 50 and 51. Each of these pins 57 penetrates and slides in a slot 59 provided respectively in the corresponding tightening bracket 8 and 9. Each of these slots 59 is inclined with respect to the axis of the steering column, in such a way as to be substantially perpendicular to the trajectory of the driver's body, at the time of an impact, which can be determined in advance on a dummy by a test.

In addition, the holding system comprises a system to prevent body-tube 10 rotating about its axis. This anti-rotation system consists of a plate 64 comprising two wings 60 and 61 parallel to each vertical member 12 and 13. The distance between the outside faces 62 and 63 of wings 60 and 61 is marginally smaller than the spacing of bearing walls 52 and 53 of tightening brackets 8 and 9. Furthermore, wings 60 and 61 of plate 64 of the anti-rotation system are traversed by axis 3 of the locking system. Another embodiment of the anti-rotation system, which is not shown in the Figures, consists of a central element fixed under the body-tube, and which is traversed by the axis of the locking system.

The reference signs inserted after the technical characteristics mentioned in the claims serve only to facilitate comprehension of said claims and in no way limit their scope.

We claim:

1. An energy-absorbing device in an automobile steering column adjustable in depth and inclination comprising:

a support structure fixed to an automobile body for receiving a steering column body-tube and a steering shaft therein and mounting the body-tube and steering shaft to the automobile body so as to be adjustable in a selected depth and inclination;

a securing device for locking the body-tube in said support structure and having a rotatable elongate tightening element mounted on the support structure extending in a direction normal to the longitudinal axis of the steering column;

said securing device having an operator operable in a direction for rotating the tightening element in a direction to tighten and lock the body-tube in said support structure;

clamping elements mounted on said support structure coactive therewith and with said tightening element for clamping the body-tube and locking it in said support structure;

said clamping elements and support structure having slots through which said tightening element extends axially coactive to accommodate positioning of the axis of the tightening element in accordance with a selected depth and inclination of the steering column in said support structure;

an energy-absorbing element mounted and connected at an end of the body-tube facing toward a driving wheel of the automobile steering column and translating therewith in response to an impact force applied to the body-tube at said end and in a direction parallel to the axis of the body-tube and effecting axial translation thereof and absorbing energy of the impact force during said translation;

intermediate toothed elements coupling the energy-absorbing element to the securing device operator for effecting translation of the securing device operator and tightening element axis in response to axial translation of the body-tube relative to said support structure to absorb energy of the impact force when the impact force is applied and said energy absorbing element is rendered effective and absorbs the energy of the impact force.

2. An energy-absorbing device according to claim 1, in which said energy-absorbing element is mounted internally of the support structure.

3. An energy-absorbing device according to claim 1, in which said energy-absorbing element comprises a flexible coiled flat band that uncoils in response to said translation.

4. An energy-absorbing device according to claim 1, in which said tightening element is a tightening rod, said clamping elements include two vertical tightening brackets on said support structure through which said rotatable tightening rod extends axially, means mounted on respective ends of the tightening rod outwardly of the respective tightening brackets for tightening of said brackets about said body tube, and said securing device operator is rigidly connected to one end of the tightening rod.

5. An energy-absorbing device according to claim 1, in which said one of intermediate toothed elements is connected to said operator of the securing device.

6. An energy absorbing device according to claim 1, in which said support structure comprises two laterally spaced vertical bracket members, and said clamping members comprise two clamping members between said vertical members each having an open V facing the body-tube and holding the body-tube therebetween for allowing inclination adjustment of the body-tube on the surfaces of the two open V members, each vertical member having a vertical slot, each clamping member having a pin extending into a corresponding vertical slot for positioning of the two clamping members relative to the vertical members of the support structure for inclination adjustment of the body-tube.

7. An energy-absorbing device according to claim 6, in which said body tube has an element fixed thereto extending downwardly from said body-tube, and said tightening element extends axially therethrough for precluding rotation of the body-tube.

8. An energy-absorbing device according to claim 6, further including a plate mounted below the body-tube and having a recess into which the body-tube is disposed for precluding rotation thereof, said plate having two flanges disposed parallel to inner surfaces of the vertical bracket members, and said tightening element extends transversely through said flanges.

9. An energy-absorbing device in an automobile steering column adjustable in depth and inclination comprising:

a support structure fixed to an automobile body for receiving a steering column body-tube and a steering shaft therein and mounting the body-tube and steering shaft to the automobile body as as to be adjustable in a selected depth and inclination;

a securing device for locking the body-tube in said support structure and having a rotatable elongate tightening element rotatably mounted on the support structure extending in a direction normal to the longitudinal axis of the steering column;

said securing device having an operator operable in a direction for rotating the tightening element in a direction to tighten and lock the body-tube in said support structure;

clamping elements mounted on said support structure coactive therewith and with said tightening element for clamping the body-tube and locking it in said support structure;

said clamping elements and support structure having respective slots through which said tightening element extends axially to accommodate positioning of the axis of the locking element in accordance with a selected depth and inclination of the steering column;

an energy-absorbing element mounted and connected at an end of the body-tube facing toward a driving wheel of the automobile steering column and translating therewith in response to an impact force applied to the body-tube at said end and in a direction parallel to the axis of the body-tube and effecting axial translation thereof;

intermediate toothed elements coupling the energy-absorbing element to the securing device operator to effect translation thereof in response to said translation of the energy-absorbing device, and said toothed elements having elongate slots for said securing device tightening element axis to translate therein in response to said impact force.

10. An energy-absorbing device according to claim 9, in which said toothed elements are two rack-like elongate elements and the teeth thereof mesh with each other when said body-tube is locked in said support structure.

11. An energy-absorbing device according to claim 10, in which said toothed elements comprise triangular cross section teeth.

12. An energy-absorbing device according to claim 10, in which said toothed elements comprise rectangular cross section teeth.

13. An energy-absorbing device according to claim 10, in which said toothed elements comprise square cross section teeth.

14. An energy-absorbing device according to claim 10, in which said meshing teeth have corresponding cross sections for meshing.

15. An energy-absorbing device according to claim 10, one of said toothed elements of which has teeth having a square cross section and the other toothed element has a circular protuberance for meshing with the square cross section teeth.

16. An energy-absorbing device according to claim 9, in which said energy-absorbing element is a coiled wire having turns about an axis, said axis being fixed to said body-tube, said wire having a free end fixed to one of said toothed elements, and said one toothed element being fixed to said body-tube.

\* \* \* \* \*